(12) United States Patent
Chang et al.

(10) Patent No.: US 7,370,430 B2
(45) Date of Patent: May 13, 2008

(54) THREE-DIMENSIONAL COLLISION DETECTION SYSTEM AND METHOD FOR A MEASURING MACHINE

(75) Inventors: Chih-Kuang Chang, Taipei Hsien (TW); Xin-Yuan Wu, Shenzhen (CN); Jie-Rong Chen, Shenzhen (CN); Xiao-Dan Tang, Shenzhen (CN); Bing-Gen Yang, Shenzhen (CN); Dong-Hai Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/558,464

(22) Filed: Nov. 10, 2006

(65) Prior Publication Data
US 2007/0144023 A1    Jun. 28, 2007

(30) Foreign Application Priority Data
Dec. 23, 2005    (CN)    ................... 2005 1 0121178

(51) Int. Cl.
*G01B 5/004*    (2006.01)
(52) U.S. Cl. ............................... 33/503; 702/168
(58) Field of Classification Search ................ 33/503, 33/556; 702/94, 95, 150, 167, 168
See application file for complete search history.

(56) References Cited

U.S. PATENT DOCUMENTS

| | | | | |
|---|---|---|---|---|
| 6,134,506 A | * | 10/2000 | Rosenberg et al. | ............ 702/95 |
| 6,212,481 B1 | * | 4/2001 | Kume | ........................ 702/167 |
| 6,658,365 B2 | * | 12/2003 | Kodaira | ..................... 702/150 |
| 6,791,323 B2 | | 9/2004 | Wang et al. | |
| 6,796,048 B2 | * | 9/2004 | Steffey et al. | ................ 33/503 |
| 2005/0086025 A1 | * | 4/2005 | Nomura et al. | ............. 702/167 |
| 2005/0154548 A1 | * | 7/2005 | Basel et al. | ................... 702/94 |

\* cited by examiner

*Primary Examiner*—G. Bradley Bennett
(74) *Attorney, Agent, or Firm*—Wei Te Chung

(57) ABSTRACT

A three-dimensional (3D) collision detection method for a measuring machine comprises the steps of: receiving parameters of a to-be-measured workpiece and a moveable arm; simulating a to-be-measured workpiece 3D-model in accordance with the parameters of the to-be-measured workpiece, and a moveable arm 3D-model in accordance with the parameters of the moveable arm; combining the to-be-measured workpiece 3D-model with the moveable arm 3D-model to form a 3D collision model; generating a measuring path of the moveable arm by calculating positional coordinates of the moveable arm according to the 3D collision model; detecting whether the moveable arm collides with the to-be-measured workpiece according to the measuring path; and outputting collision results that include the collision coordinates and the measuring path. A related system is also disclosed.

12 Claims, 7 Drawing Sheets

THREE-DIMENSIONAL COLLISION DETECTION SYSTEM AND METHOD FOR A MEASURING MACHINE

BACKGROUND OF THE INVENTION

1. Field of the Invention

The present invention generally relates to the field of a collision detection technology, and more particularly to a three-dimensional collision detection system and method for a measuring machine.

2. Description of Related Art

It is understood that, measuring machines, as used in product development and production, are used for improving production quality of an enterprise. In general, three-Dimensional (hereinafter, "3D") measurement is widely used in the manufacturing industry for detecting a newly developed product on a measuring machine. However, the 3D measuring machines need to have a high precision when measuring physical dimensions and geometric tolerances of the product.

A 3D collision is a collision between a moveable arm of the measuring machine and a to-be-measured workpiece on the measuring machine when an operator measures the physical dimensions and the geometric tolerances of the product. Such 3D collisions may result in damaging or even destroying the to-be-measured workpiece and/or the measuring machine, as a result the measuring machine may malfunction. More importantly, manually predicting, calculating, and avoiding the 3D collisions becomes a severe inefficiency problem resulting in time consuming and decreased productivity.

What is needed, therefore, is a 3D collision detection system and method for a measuring machine, which can automatically detect the 3D collision between the moveable arm of the measuring machine and the to-be-measured workpiece on the measuring machine by utilizing a computer program instead of the manual measurement means. Such 3D collision detection method can obtain accurate results of the 3D collisions, and can automatically predict and avoid the 3D collisions on the measuring machine.

SUMMARY OF THE INVENTION

A preferred embodiment of a three-dimensional (3D) collision detection system for a measuring machine in accordance with a preferred embodiment includes: a parameter inputting module configured for inputting various parameters of a to-be-measured workpiece and a moveable arm; a model simulating module configured for simulating a to-be-measured workpiece 3D-model in accordance with the parameters of the to-be-measured workpiece, and a moveable arm 3D-model in accordance with the parameters of the moveable arm, and for combining the to-be-measured workpiece 3D-model with the moveable arm 3D-model to form a 3D collision model; a calculating module configured for calculating various positional coordinates of the moveable arm according to the 3D collision model to generate a measuring path of the moveable arm; a collision predicting module configured for detecting whether the moveable arm collides with the to-be-measured workpiece according to the measuring path; and a processing module configured for plotting the measuring path with a first color from a take-off point to a collision point if the moveable arm collides with the to-be-measured workpiece, and for plotting the measuring path with a second color from the take-off point to a terminal point if the moveable arm does not collide with the to-be-measured workpiece.

The system further includes a result outputting module configured for outputting collision results that include corresponding the collision point coordinates and the measuring path with the first color or the measuring path with the second color.

Another preferred embodiment provides a 3D collision detection method for a measuring machine, by utilizing the above system. The method includes the steps of: (a) receiving various parameters of the to-be-measured workpiece and the moveable arm; (b) simulating a to-be-measured workpiece 3D-model in accordance with the parameters of the to-be-measured workpiece, and a moveable arm 3D-model in accordance with the parameters of the moveable arm; (c) combining the to-be-measured workpiece 3D-model with the moveable arm 3D-model to form a 3D collision model; (d) calculating positional coordinates of the moveable arm according to the 3D collision model to generate a measuring path of the moveable arm; (e) detecting whether the moveable arm collides with the to-be-measured workpiece according to the measuring path; and (f) plotting the measuring path with a first color from a take-off point to a collision point of the measuring path if the moveable arm collides with the to-be-measured workpiece; or plotting the measuring path with a second color from the take-off point to the terminal point if the moveable arm does not collide with the to-be-measured workpiece.

Other advantages and novel features of the embodiments will be drawn from the following detailed description with reference to the attached drawings, in which:

DETAILED DESCRIPTION OF THE INVENTION

Figure 1:
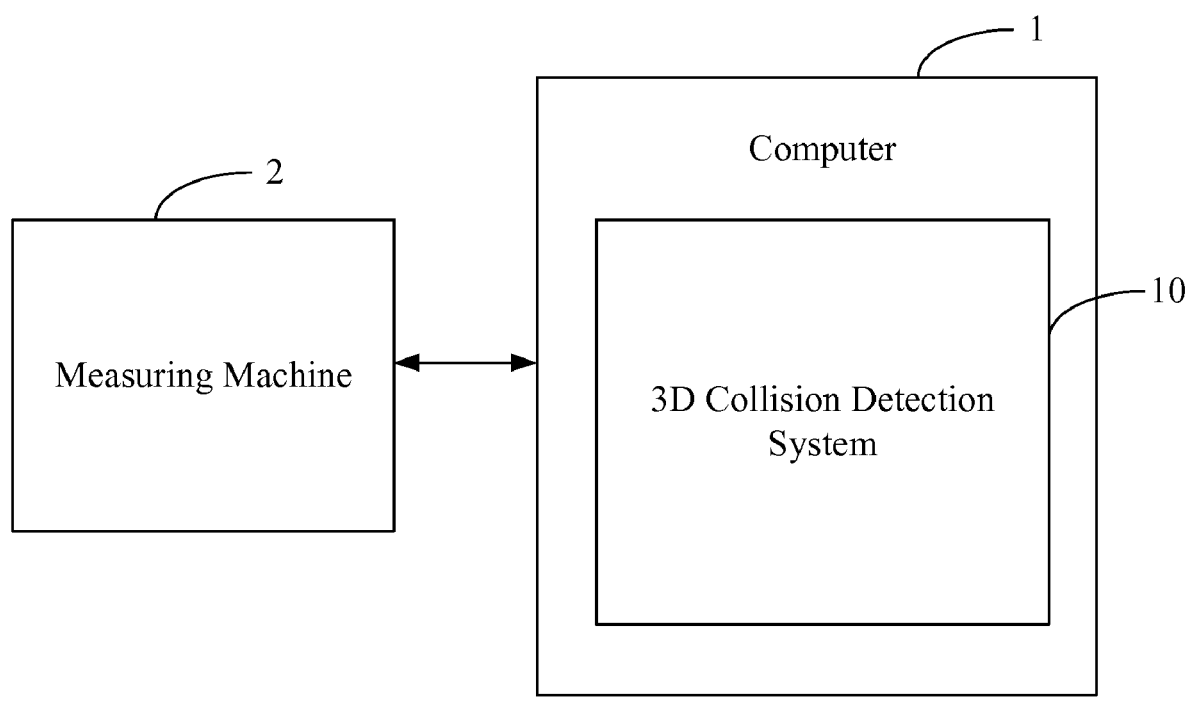
FIG. 1 is a schematic diagram illustrating a hardware environment of implementing a 3D collision detection system for a measuring machine in accordance with a preferred embodiment.

FIG. 1 is a schematic diagram illustrating a hardware environment of implementing a three-dimensional (hereinafter referred to as "3D") collision detection system (hereinafter "the system 10") for a measuring machine in accordance with a preferred embodiment. The system 10 is installed and implemented in a computer 1. In the preferred embodiment, the computer 1 is connected with a measuring machine 2 that is typically used in the manufacturing industry.

Figure 2:
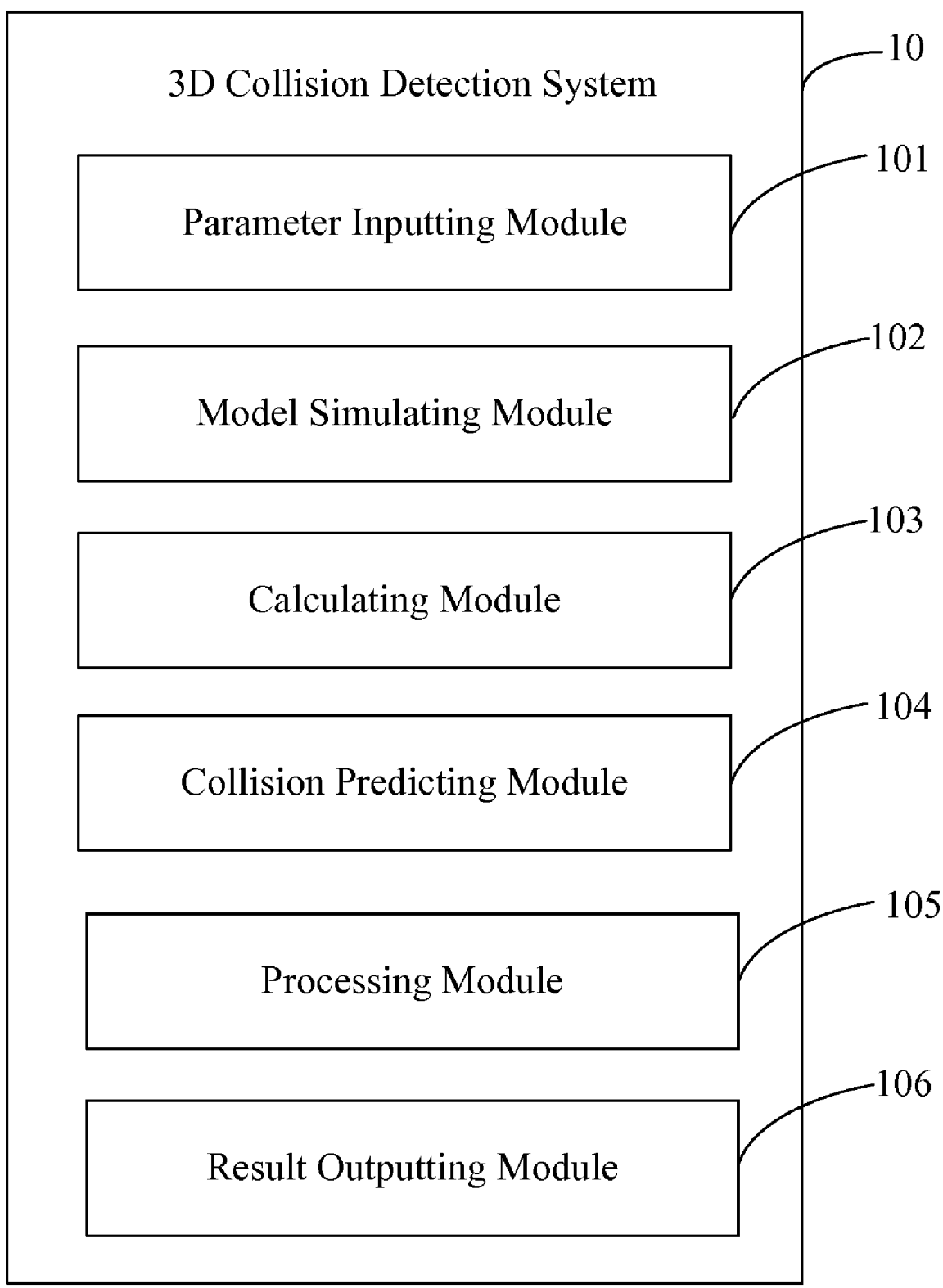
FIG. 2 is a schematic diagram illustrating function modules of the 3D collision detection system of FIG. 1.

FIG. 2 is a schematic diagram illustrating function modules of the 3D collision detection system 10 of FIG. 1. The 3D collision detection system 10 includes a parameter inputting module 101, a model simulating module 102, a calculating module 103, a collision predicting module 104, a processing module 105, and a result outputting module 106. In order to illustrate various functions of above-described modules, an 3D collision detection model between a to-be-measured workpiece 3 and a moveable arm 4 (i.e. a probe/measuring arm) (shown in FIG. 3), and locus of points of the to-be-measured workpiece 3 and the moveable arm 4 (shown in FIG. 4) are described as follows.

Figure 3:
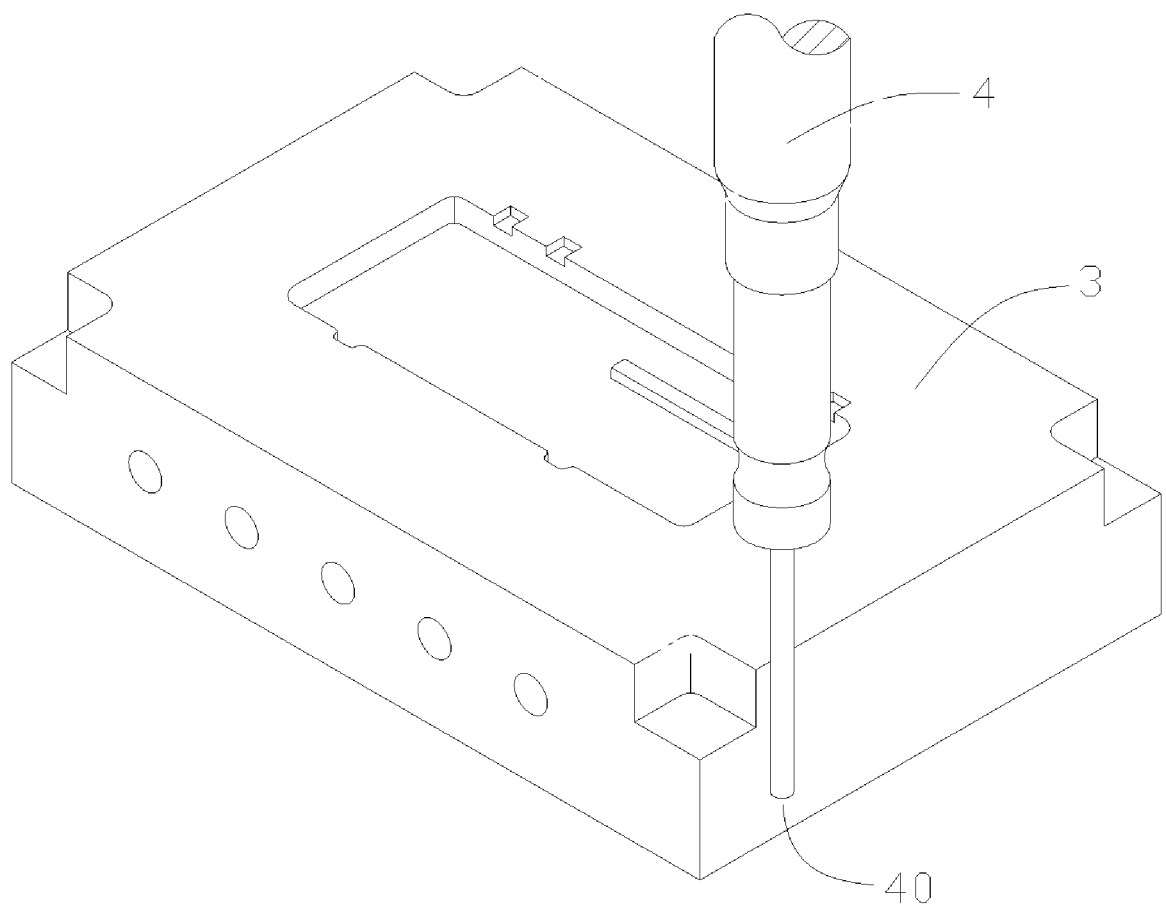
FIG. 3 is a schematic diagram of a 3D collision detection model between a to-be-measured workpiece and a moveable arm.

FIG. 3 is a schematic diagram of an 3D collision detection model between the to-be-measured workpiece 3 and the moveable arm 4. In the preferred embodiment, the moveable arm 4 is installed on the measuring machine 2, and is configured for measuring physical attributes of the to-be-measured workpiece 3. Referring to FIG. 2, the moveable arm 4 consists of a measuring point 40 that corresponds to a collision point of the moveable arm 4 on the to-be-measured workpiece 3.

Figure 4:
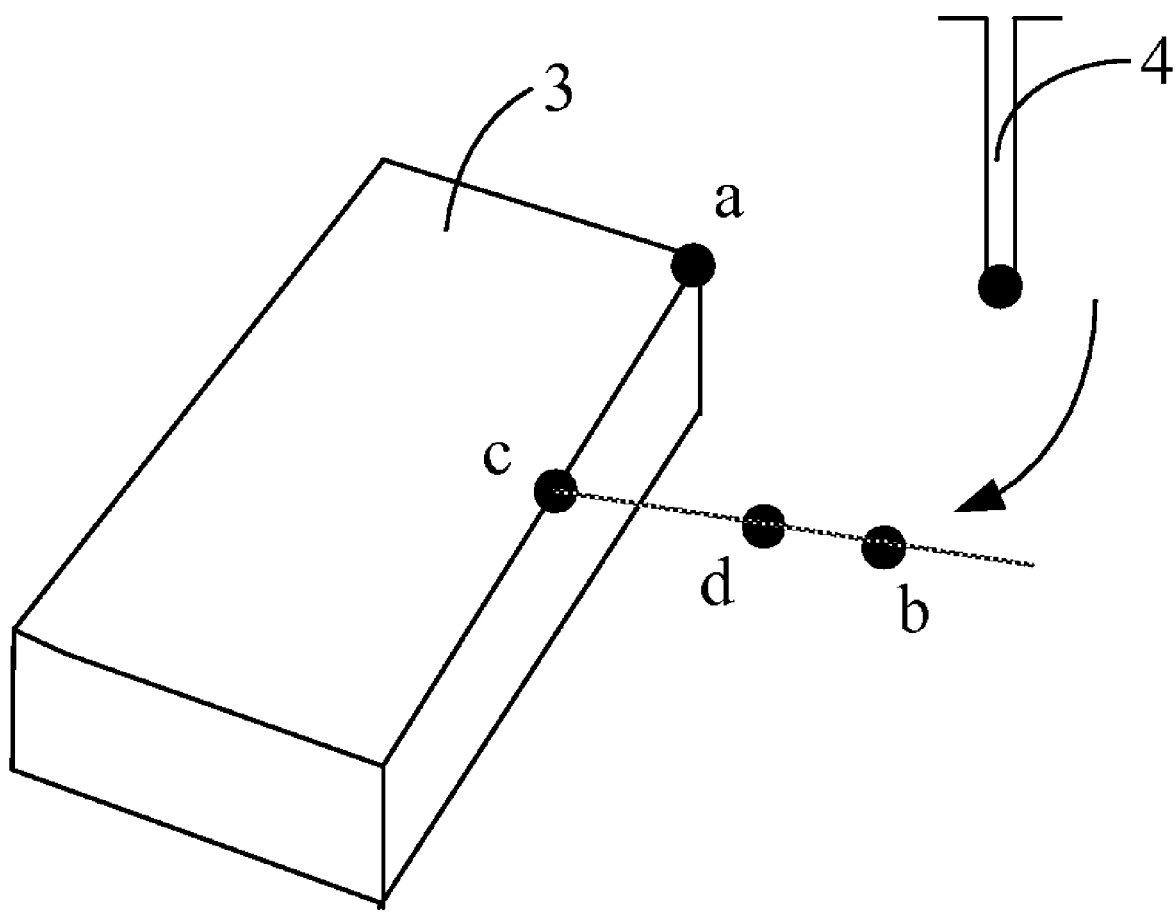
FIG. 4 is a schematic diagram of locus of points of the to-be-measured workpiece and the moveable arm.

FIG. 4 is a schematic diagram of locus of points of the to-be-measured workpiece 3 and the moveable arm 4. In order to describe the preferred embodiment, two points are defined that locates on the to-be-measured workpiece 3, and another two points are defined between the to-be-measured workpiece 3 and the moveable arm 4. Referring to FIG. 4, a point "a" represents a point on a surface of the to-be-measured workpiece 3, and a point "c" represents the collision point between the movable arm 4 and the to-be-measured workpiece 3. A point "b" represents a take-off point, and a point "d" represents a ricochet point. In general, the point "b," "c," and "d" lies on a same line. A distance between the point "b" and the point "c" represents a minimum measuring distance between the to-be-measured workpiece 3 and the moveable arm 4. A distance between the point "c" and the point "d" represents a ricochet distance after the moveable arm 4 collides with the to-be-measured workpiece 3. In other words, the movable arm 4 will undertake a measuring path to measure the to-be-measured workpiece 3. The moveable arm 4 would move towards the to-be-measured workpiece 3 from the take-off point "b", when the moveable arm 4 collides with the to-be-measured workpiece 3 at the collision point "c", it will bounce off the to-be-measured workpiece 3 to the ricochet point "d".

Referring to FIG. 2, FIG. 3 and FIG. 4, the function modules of the 3D collision detection system 10 are described as follows. The parameter inputting module 101 is configured for inputting various parameters of the to-be-measured workpiece 3 and the moveable arm 4. The parameters include various point coordinates of the to-be-measured workpiece 3 and the moveable arm 4, and various space vectors of the to-be-measured workpiece 3 and the moveable arm 4. The point coordinates and the space vectors are used for measuring the collision distance and the ricochet distance.

The model simulating module 102 is configured for simulating a to-be-measured workpiece 3D-model in accordance with the parameters of the to-be-measured workpiece 3, and a moveable arm 3D-model in accordance with the parameters of the moveable arm 4, and for combining the to-be-measured workpiece 3D-model with the moveable arm 3D-model to form an 3D collision model. In the preferred embodiment, the to-be-measured workpiece 3D-model and the moveable arm 3D-model are in a 1:1 ratio in the 3D collision model. After simulating the 3D collision model, the model simulating module 102 is further config-ured for taking/re-centering/mapping an origin of the 3D collision model to the measuring point of the moveable arm 3D-model at the take-off point of the measuring path. The model simulating module 102 analyzes the measuring path in relation to the to-be-measured workpiece 3. For each measuring path, the model simulating module 102 re-centers the origin of the 3D collision model to each take-off point correspondingly.

The calculating module 103 is configured for calculating various positional coordinates of the moveable arm 4 according to the 3D collision model to generate a measuring path of the moveable arm 4. In the preferred embodiment, the positional coordinates of the 3D collision model include origin coordinates of the 3D collision model represented with P (X, Y, Z), coordinates of the measuring point represented with P' (X', Y', Z'), coordinates of the take-off point "b" represented with $P_1$ ($X_1$, $Y_1$, $Z_1$), coordinates of the collision point "c" represented with $P_2$ ($X_2$, $Y_2$, $Z_2$), and coordinates of the ricochet point "d". The calculating module 103 calculates the coordinates of the collision point "c" by utilizing the formulas as follows: $X_2=\vec{I}*D+X_1$, $Y_2=\vec{J}*D+Y_1$, and $Z_2=\vec{K}*D+Z_1$. Wherein the distance "D" represents a distance between the origin coordinates of the 3D collision model and the measuring point of the moveable arm 3D-model, and ($\vec{I}$, $\vec{J}$, $\vec{K}$) represents a space vector of the 3D collision model.

The calculating module 103 is further configured for calculating the minimum measuring distance "$D_0$" according to the formulas as follows: $D_x=|X_1-X_2|$, $D_y=|Y_1-Y_2|$, $D_z=|Z_1-Z_2|$, and $D_0=\sqrt{D_x^2+D_y^2+D_z^2}$, and for calculating the ricochet distance "D'" according to the following formulas: $D_x=|X_1-R-X'|$, $D_y=|Y_1-R-Y'|$, $D_z=|Z_1-R-Z'|$, and $D'=\sqrt{D_x^2+D_y^2+D_z^2}$, wherein R is a radius of the collision point 40.

The collision predicting module 104 is configured for detecting whether the moveable arm collides with the to-be-measured workpiece according to the measuring path of the moveable arm.

The processing module 105 is configured for plotting a measuring path with a first color (e.g. a red path) from a take-off point to a collision point if the moveable arm 4 collides with the to-be-measured workpiece 3, and for plotting the measuring path with a second color (e.g. a yellow) from the take-off point to a terminal point if the moveable arm 4 does not collide with the to-be-measured workpiece 3.

The result outputting module 106 is configured for outputting collision results that include the positional coordinates of the 3D collision model, and the measuring path with the first color or the measuring path with the second color.

Figure 5:
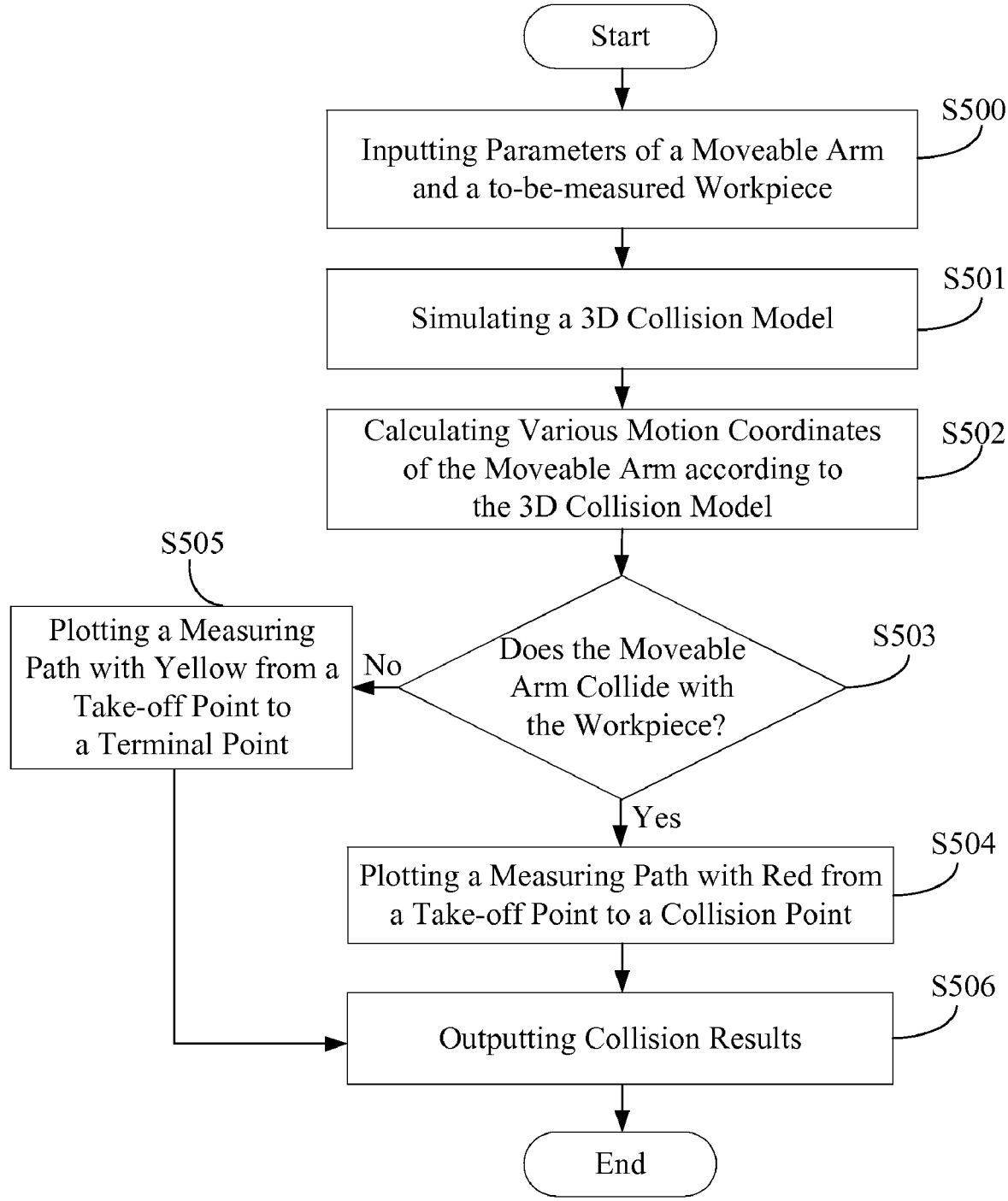
FIG. 5 is a main flowchart of a preferred 3D collision detection method for a measuring machine by implementing the system of FIG. 2.

FIG. 5 is a main flowchart of a preferred 3D collision detection method for a measuring machine by implementing the system 10. In step S500, the parameter inputting module 101 receives various parameters of the to-be-measured workpiece 3 and the moveable arm 4, The parameters include various point coordinates of the to-be-measured workpiece 3 and the moveable arm 4, and various space vectors of the to-be-measured workpiece 3 and the moveable arm 4. The point coordinates and the space vectors are used for measuring the collision distance and the ricochet distance.

In step S501, the model simulating module 102 simulates a to-be-measured workpiece 3D-model in accordance with the parameters of the to-be-measured workpiece 3, and a moveable arm 3D-model in accordance with the parameters of the moveable arm 4, and combining the to-be-measured workpiece 3D-model with the moveable arm 3D-model to form a 3D collision model. In the preferred embodiment, the to-be-measured workpiece 3D-model and the moveable arm 3D-model are in a 1:1 ratio in the 3D collision model.

In step S502, the calculating module 103 calculates various positional coordinates of the moveable arm according to the 3D collision model, in order to generate a measuring path of the moveable arm 4. In the preferred embodiment, the positional coordinates of the 3D collision model include origin coordinates of the 3D collision model represented with P (X, Y, Z), coordinates of the measuring point represented with P' (X', Y', Z'), coordinates of the take-off point "b" represented with $P_1$ ($X_1$, $Y_1$, $Z_1$), coordinates of the collision point "c" represented with $P_2$ ($X_2$, $Y_2$, $Z_2$), and coordinates of the ricochet point "d". The calculating module 103 calculates the coordinates of the collision point "c" by utilizing the formulas as follows: $X_2 = \vec{I} *D + X_1$, $Y_2 = \vec{J}*D+Y_1$, and $Z_2 = \vec{K}*D+Z_1$. Wherein the distance "D" represents a distance between the origin coordinates of the 3D collision model and the measuring point of the moveable arm 3D-model, and ($\vec{I}$, $\vec{J}$, $\vec{K}$) represents the space vector of the 3D collision model.

In step S503, the collision predicting module 104 detects whether the moveable arm 4 collides with the to-be-measured workpiece 3 according to the measuring path of the moveable arm 4. If the moveable arm 4 collides with the to-be-measured workpiece 3, in step S504, the processing module 105 plots the measuring path with a first color (i.e. a red path) from the take-off point to the collision point. Otherwise, if the moveable arm 4 does not collide with the to-be-measured workpiece 3, in step S505, the processing module 105 plots the measuring path in a second color (i.e. a yellow path) from the take-off point to the terminal point.

In step S506, the result outputting module 106 outputs collision results that include the positional coordinates of the 3D collision model, and the measuring path with the first color or the measuring path with the second color.

Figure 6:
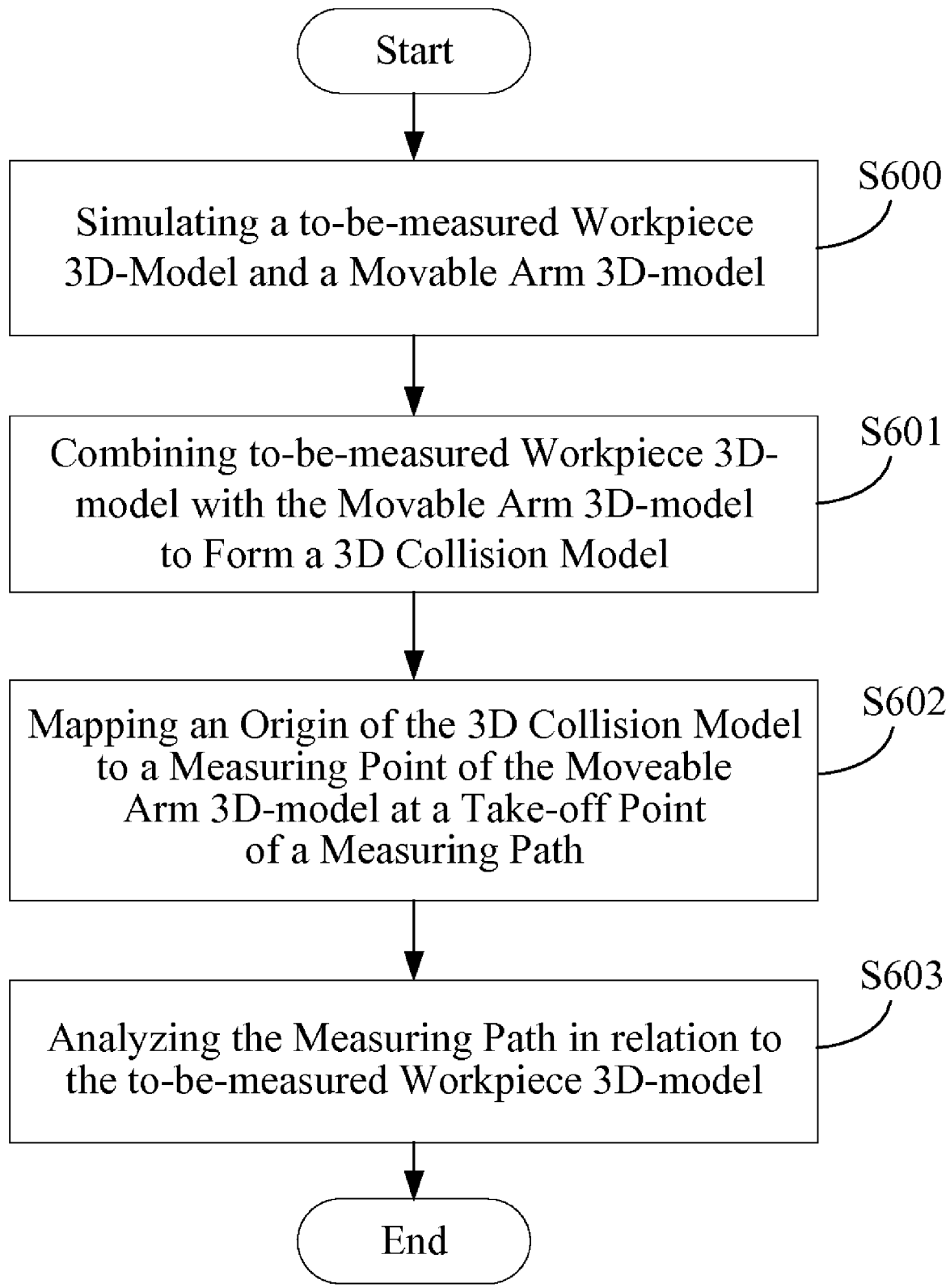
FIG. 6 is a flowchart illustrating simulating a 3D collision model of the step S501 of FIG. 5.

FIG. 6 is a flowchart illustrating simulating a 3D collision model of the step S501 of FIG. 5. In step S600, the collision model simulating module 102 simulates the to-be-measured workpiece 3D-model according to the parameters of the to-be-measured workpiece 3, and the moveable arm 3D-model according to the parameters of the moveable arm 4.

In step S601, the model simulating module 102 combines the to-be-measured workpiece 3D-model with the moveable arm 3D-model to form the 3D collision model. In step S602, the model simulating module 102 maps the origin of the 3D collision model to the measuring point of the moveable arm 3D-model at the take-off point of the measuring path.

In step S603, the model simulating module 102 analyzes the measuring path in relation to the to-be-measured workpiece 3. For each measuring path, the model simulating module 102 re-centers the origin of the 3D collision model to each take-off point "b" correspondingly.

Figure 7:
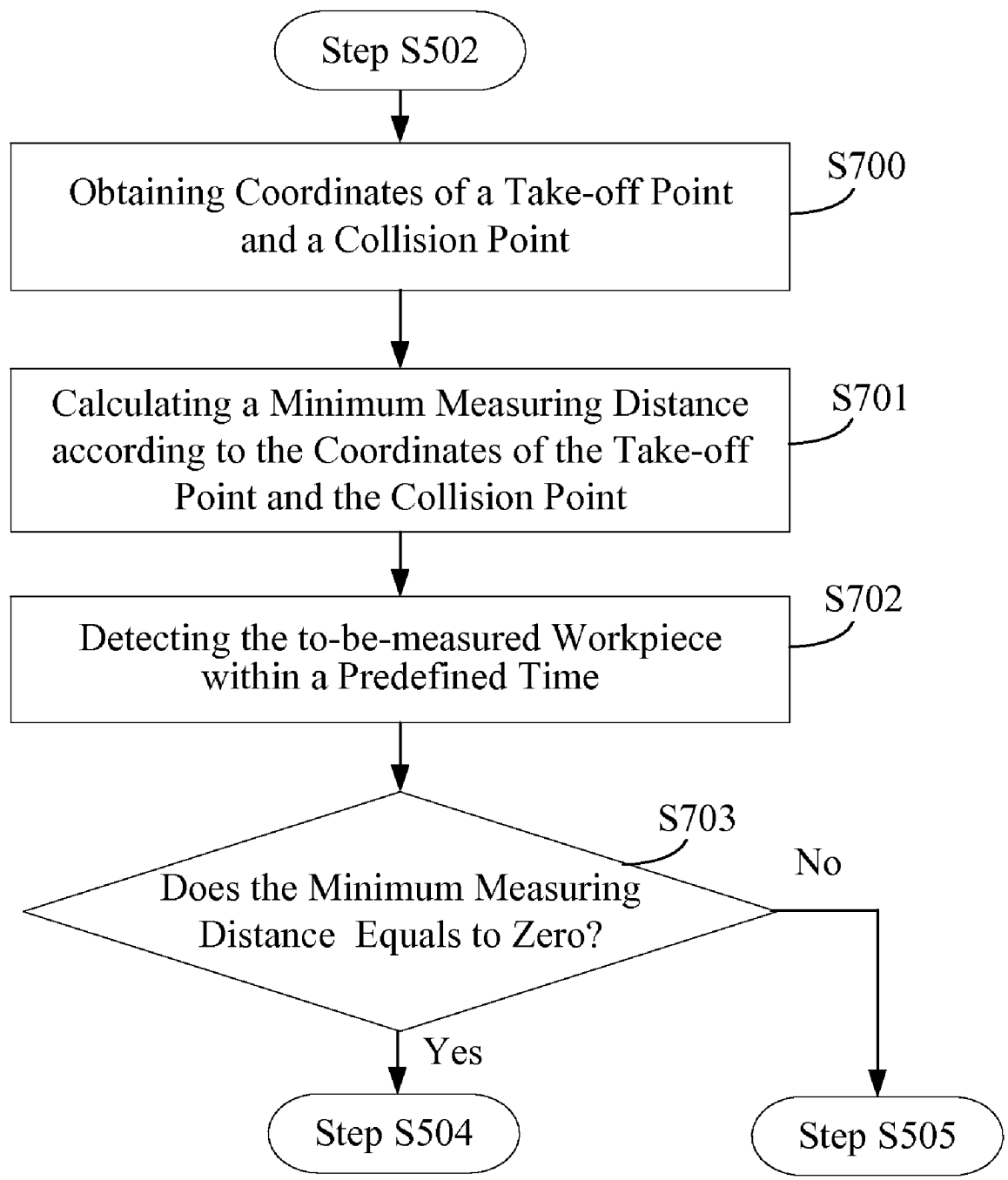
FIG. 7 is a flowchart illustrating the moveable arm colliding with the to-be-measured workpiece of the step S503 of FIG. 5.

FIG. 7 is a flowchart illustrating the moveable arm 4 colliding with the to-be-measured workpiece 3 of the step S503 of FIG. 5. In step S700, the collision predicting module 104 obtains the coordinates of the take-off point "b", the coordinates of the collision point "c", and the coordinates of the ricochet point "d". In step S701, the calculating module 103 calculates the minimum measuring distance "$D_0$" according to the formulas as follows: $D_x=|X_1-X_2|$, $D_y=|Y_1-Y_2|$, $D_z=|Z_1-Z_2|$, and $D_0=\sqrt{D_x^2+D_y^2+D_z^2}$, and the ricochet distance "D'" according to the following formulas: $D_x=|X_1-R-X'|$, $D_y=|Y_1-R-Y'|$, $D_z=|Z_1-R-Z'|$, and $D'=\sqrt{D_x^2+D_y^2+D_z^2}$, wherein R is the radius of the collision point.

In step S702, the collision predicting module 104 detects the to-be-measured workpiece 3 within a predefined time (i.e. 1 second), in order to determine whether the moveable arm 4 collides with the to-be-measured workpiece 3. In step S703, the collision predicting module 104 determines whether the minimum measuring distance equals to zero. If the minimum measuring distance does not equal to zero (that is, the movable arm 4 has not collided with the to-be-measured workpiece 3), the procedure returns to the step S505 of FIG. 5 described above. Otherwise, if the minimum measuring distance equals to zero (that is, the movable arm 4 has collided with the to-be-measured workpiece 3), the procedure returns to the step S504 of FIG. 5 described above.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A three-dimensional (hereinafter referred to as "3D") collision detection system for a measuring machine implemented by a computer, the system comprising:
    a parameter inputting module configured for inputting various parameters of a to-be-measured workpiece and a moveable arm;
    a model simulating module configured for simulating a to-be-measured workpiece 3D-model in accordance with the parameters of the to-be-measured workpiece, and a moveable arm 3D-model in accordance with the parameters of the moveable arm, and for combining the to-be-measured workpiece 3D-model with the moveable arm 3D-model to form a 3D collision model;
    a calculating module configured for calculating various positional coordinates of the moveable arm according to the 3D collision model to generate a measuring path of the moveable arm;
    a collision predicting module configured for detecting whether the moveable arm collides with the to-be-measured workpiece according to the measuring path; and
    a processing module configured for plotting the measuring path with a first color from a take-off point to a collision point if the moveable arm collides with the to-be-measured workpiece, or plotting the measuring path with a second color from the take-off point to a terminal point if the moveable arm does not collide with the to-be-measured workpiece.

2. The system according to claim 1, further comprising a result outputting module configured for outputting collision results that comprise the collision point coordinates and the measuring path with the first color or the measuring path with the second color.

3. The system according to claim 1, wherein the model simulating module is further configured for an origin of the 3D collision model to the measuring point of the moveable arm 3D-model at the take-off point of the measuring path.

4. The system according to claim 1, wherein the parameters include various point coordinates of the to-be-measured workpiece and the moveable arm, and various space vectors of the to-be-measured workpiece and the moveable arm.

5. The system according to claim 4, wherein the calculating module is further configured for calculating a minimum measuring distance and a ricochet distance in accordance with the point coordinates and the space vectors.

6. A three-dimensional (hereinafter referred to as "3D") collision detection method for a measuring machine implemented by a computer, the method comprising the steps of:
   receiving various parameters of a to-be-measured workpiece and a moveable arm;
   simulating a to-be-measured workpiece 3D-model in accordance with the parameters of the to-be-measured workpiece, and a moveable arm 3D-model in accordance with the parameters of the moveable arm;
   combining the to-be-measured workpiece 3D-model with the moveable arm 3D-model to form a 3D collision model;
   calculating positional coordinates of the moveable arm according to the 3D collision model to generate a measuring path of the moveable arm;
   detecting whether the moveable arm collides with the to-be-measured workpiece according to the measuring path; and
   plotting the measuring path with a first color from a take-off point to a collision point, if the moveable arm collides with the to-be-measured workpiece.

7. The method according to claim 6, further comprising the step of:
   plotting the measuring path with a second color from the take-off point to a terminal point, if the moveable arm does not collide with the to-be-measured workpiece.

8. The method according to claim 7, further comprising the step of:
   outputting collision results that comprise the positional coordinates, and the measuring path with the first color or the measuring path with the second color.

9. The method according to claim 6, further comprising the step of:
   mapping an origin of the 3D collision model to the collision point of the moveable arm 3D-model at the take-off point of the measuring path;
   analyzing the measuring path in relation to the to-be-measured workpiece; and
   re-centering the origin of the 3D collision model to the take-off point of the measuring path correspondingly.

10. The method according to claim 6, wherein the detecting step comprises the steps of:
    obtaining coordinates of the take-off point and coordinates of the collision point;
    calculating a minimum measuring distance in accordance with the coordinates of the take-off point and the coordinates of the collision point;
    determining whether the minimum measuring distance equals to zero; and
    outputting a collision result that includes the collision point coordinates and the measuring path with the first color, if the minimum measuring distance equals to zero.

11. The method according to claim 6, wherein the parameters include various point coordinates of the to-be-measured workpiece and the moveable arm, and various space vectors of the to-be-measured workpiece and the moveable arm.

12. The system according to claim 11, wherein the point coordinates and the point vectors are used for measuring a minimum measuring distance and a ricochet distance.

* * * * *